UNITED STATES PATENT OFFICE.

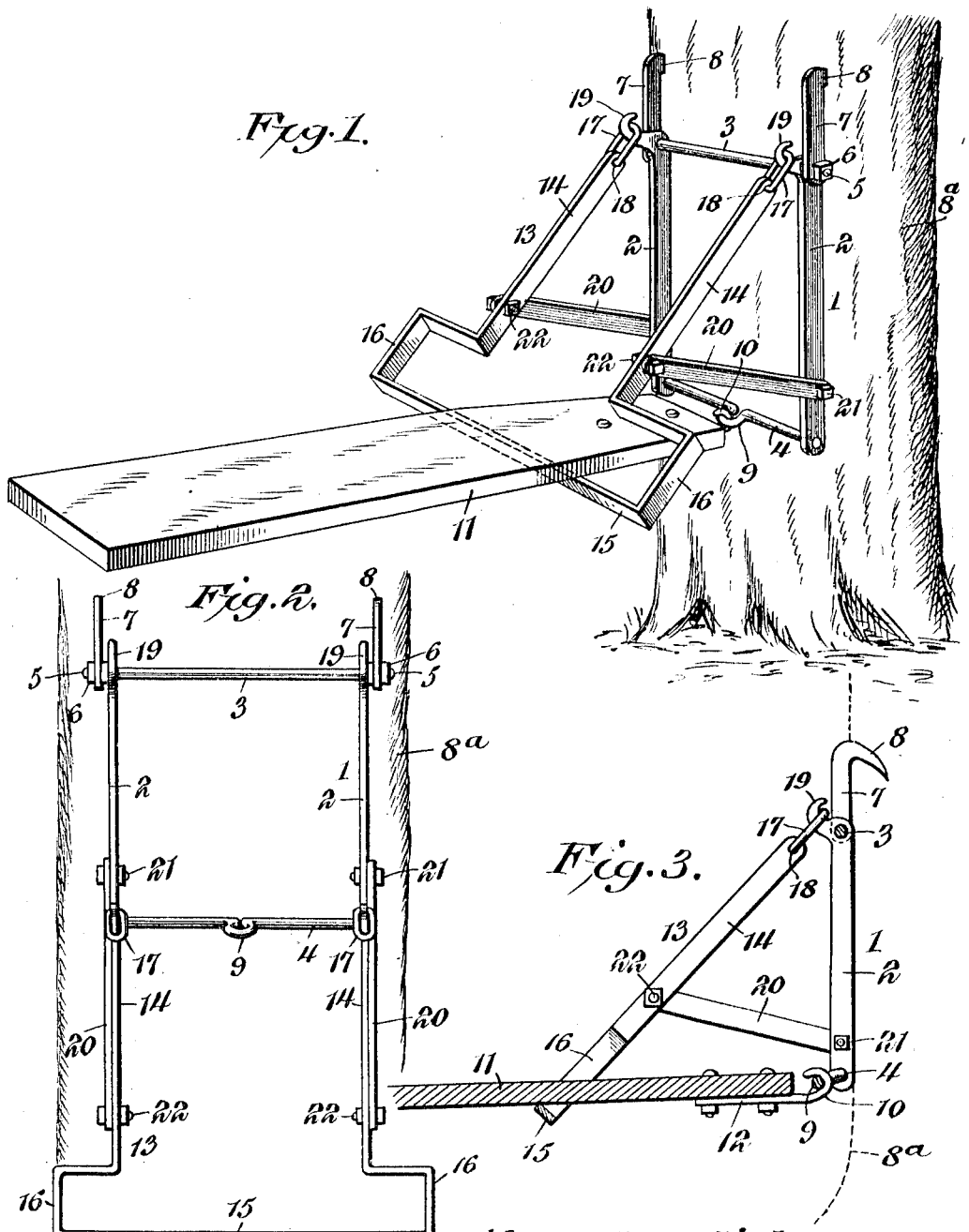

HENRY HARDISTY, OF RAYMOND, WASHINGTON.

TREE-FELLING SCAFFOLD.

1,117,374. Specification of Letters Patent. Patented Nov. 17, 1914.

Application filed May 4, 1914. Serial No. 836,251.

*To all whom it may concern:*

Be it known that I, HENRY HARDISTY, a citizen of the United States, residing at Raymond, in the county of Pacific and State of Washington, have invented a new and useful Tree-Felling Scaffold, of which the following is a specification.

The invention relates to improvements in tree felling scaffolds.

The object of the present invention is to improve the construction of tree felling scaffolds and to provide a simple, inexpensive, and efficient scaffold of light, strong, and durable construction, adapted to be easily and conveniently handled, and capable of being quickly applied to trees of different sizes, and of affording a secure support for the chopper, without liability of sagging or dropping.

A further object of the invention is to provide a collapsible tree felling scaffold of this character, capable of being instantly operated to cause the platform board to fall clear of the supporting means, and the latter to fold automatically against the trunk of the tree to which it is applied, so that there will be no chance of any portion of the scaffold being broken or otherwise injured by a falling tree.

With these and other objects in view the invention consists in the construction and novel combination of parts hereinafter fully described, illustrated in the accompanying drawing, and pointed out in the claims hereto appended, it being understood that various changes in the form, proportion, size and minor details of construction, within the scope of the claims, may be resorted to without departing from the spirit or sacrificing any of the advantages of the invention.

In the drawing:—Figure 1 is a side elevation of a tree felling scaffold constructed in accordance with this invention and shown applied to a tree in position for use. Fig. 2 is a front elevation, the platform supporting means being folded or arranged flat against the tree. Fig. 3 is a vertical longitudinal sectional view, the parts being arranged as shown in Fig. 1.

Like numerals of reference designate corresponding parts in all the figures of the drawing.

In the accompanying drawing, in which is illustrated the preferred embodiment of the invention, the tree felling scaffold comprises, in its construction, an inner main or relatively fixed frame 1 composed of vertical side bars 2 and upper and lower transversely disposed connecting rods 3 and 4, having their terminals piercing the side bars 2 and secured to the same. The transverse rods 3 and 4 are horizontal and the terminals 5 of the upper rod 3 are extended and threaded for the reception of nuts 6 arranged in pairs and located at the inner and outer faces of dogs 7, which are retained on the ends of the upper rod 3 by the outer nuts. The dogs have downwardly and rearwardly inclined engaging portions or bills 8, which are adapted to be driven into the trunk of a tree, whereby the device may be instantly applied to trees of different sizes, and is adapted to effect a material saving in time and labor over the board commonly employed, and requiring from seven to fifteen minutes for cutting a board hole in a tree. The vertical side bars of the relatively fixed frame 2 are adapted to fit against the trunk 8 of a tree, as clearly shown in Fig. 1 of the drawing, and when the bills or engaging portions of the dogs 7 are driven into the tree, the device is firmly fastened in position and may be used with perfect safety. The terminals 5 of the upper rod 3 pivotally connect the dogs 7 and the main or relatively fixed frame, and enable the dogs to be independently adjusted in driving them into a tree.

The lower transverse rod 4, which has its terminals riveted or otherwise secured to the lower ends of the side bars 2, is provided with a central eye 9, preferably formed by bending the rod, as shown, and adapted to be engaged by an upwardly extending hook 10 projecting from the inner or rear end of a board 11, which constitutes a supporting platform. The hook 10 and the central eye 9 detachably couple the inner end of the platform to the relatively fixed frame, and the said hook is provided with an attaching shank 12, which is bolted or otherwise secured to the lower face of the board 11, and the latter is supported beyond the relatively fixed frame by a movable bracket frame 13. The movable bracket frame 13, which is set at an inclination when in its supporting position to offset its supporting portion from the frame, is substantially U-shaped, being composed of spaced sides 14 and a connecting bottom portion 15, located in advance of and in spaced relation with the lower rod 4. The sides 14 of the bracket frame or member are provided at their lower portions with right angle bends which laterally offset the lower portions of the sides 14, and form transverse loops or extensions 16. The enlarged lower portion of the bracket frame provides ample space for enabling the board 11 to be readily disengaged from the eye of the rod 4, and to fall clear of the supporting means when the scaffold is collapsed, is hereinafter fully explained. The sides 14 are detachably connected at their upper terminals with the relatively fixed frame by links 17, linked into perforations 18 of the upper ends of the sides 14, and engaging hooks 19 of the side bars 2. The hooks 18, which are preferably formed integral with the upper ends of the side bars 2, extend forwardly therefrom and have bills which extend upwardly and inwardly or rearwardly, so that there is no liability of the links 17 being accidentally disengaged from the hooks. The movable bracket frame is braced in its inclined supporting position by link bars 20, pivotally connected at their inner and outer ends with the side bars 2 and the sides 14 of the movable frame by bolts 21 and 22, or other suitable fastening devices, and extending outwardly and upwardly at an inclination when the scaffold is in use, whereby the platform supporting bracket is rigidly maintained in its inclined position. By this arrangement the board is securely maintained in position, and there is no liability of its sagging when subjected to the weight of a person, and the weight of a wood chopper upon the platform will effectually prevent the link 17 from becoming accidentally disconnected from the hooks 19.

When it is desired to collapse the bracket scaffold to prevent it from being injured by a falling tree, it is only necessary for the person using it to jump over the platform, disengage the hook end of the board from the eye, and lift the bracket frame sufficiently to disengage the links from the hooks 19. The board will then fall clear and the supporting means will collapse flat against the tree, and it will be impossible for any portion of the scaffold to be injured by the falling of a tree. As it is only necessary to withdraw the engaging portions or bills of the dog from the tree to detach the device, the latter may be quickly transferred from one tree to another. Also, after the dogs have been driven into a tree, the device may be instantly set up by engaging the links 17 with the hooks 19, and placing the platform in the bracket frame and engaging the hook 9 with the eye of the lower rod.

What is claimed is:

1. A tree felling scaffold including an inner frame having hooks to engage a tree, a collapsible bracket connected to the frame and having an offset supporting portion foldable approximately flat against the tree when the bracket is collapsed, and a supporting platform coupled to the inner frame and resting upon the said bracket.

2. A collapsible tree felling scaffold comprising a relatively fixed frame, means for securing the same to a tree, a bracket frame having a lower supporting portion offset from and arranged in spaced relation with the relatively fixed frame and detachably connected at its upper portion with the same, bracing means pivotally connecting the lower portion of the bracket frame with the relatively fixed frame, said bracing means permitting the said bracket frame to swing downwardly and collapse when the upper portion of the bracket frame is disconnected from the relatively fixed frame, and a platform supported by the said frames.

3. A collapsible tree felling scaffold including a relatively fixed frame, means for securing the same to a tree, a bracket frame having an offset supporting portion, means for detachably connecting the upper portion of the bracket frame with the relatively fixed frame, bracing means pivotally connected with the said frames and adapted to permit the bracket frame to swing downwardly when the upper portion thereof is disconnected from the relatively fixed frame, and a platform supported at a point intermediate of its ends by the bracket frame and detachably connected at its inner end to the relatively fixed frame.

4. A collapsible tree felling scaffold including a relatively fixed frame having side bars provided with projecting hooks, means for securing the said frame to a tree, a bracket frame having spaced sides provided at their upper ends with means for detachably engaging the projecting hooks of the relatively fixed frame, bars pivotally connected to the lower portions of the said frames at opposite sides thereof and spacing the lower portion of the bracket frame from the relatively fixed frame, and a platform supported by the said frames.

5. A collapsible tree felling scaffold including a relatively fixed frame provided at the bottom with an eye, an inclined bracket frame detachably connected at the top with a relatively fixed frame, bracing means pivotally connecting the lower portions of the said frames, and a platform supported at an intermediate point by the bracket frame and provided at its inner end with a hook engaging the eye of the relatively fixed frame.

6. A collapsible tree felling scaffold including a relatively fixed frame composed of side bars provided at their upper ends with hooks, upper and lower transverse rods connecting the side bars, the lower rod being provided with an eye, a bracket frame having an offset supporting portion provided at the top with means for engaging the said hooks, link bars pivotally connecting the lower portions of the said frames and adapted to permit the bracket frame to swing downwardly when disconnected from the said hooks, and a platform supported at an intermediate point by the bracket frame and provided at its inner end with a hook engaging the eye of the lower rod of the relatively fixed frame.

7. A collapsible tree felling scaffold including a relatively fixed frame, means for securing the same to a tree, an approximately U-shaped bracket frame composed of spaced sides and a connecting bottom portion offset from the relatively fixed frame, means for detachably connecting the upper ends of the sides of the bracket frame with the relatively fixed frame, bracing means pivotally connected with the lower portions of the said frames, and a platform supported upon the bottom connecting portion of the bracket frame and connected with the relatively fixed frame.

8. A collapsible tree felling scaffold including a relatively fixed frame, an approximately U-shaped bracket frame composed of spaced sides having laterally extended lower portions offset from the relatively fixed frame and a transverse portion connecting the extensions of the sides and forming with the same lateral loops, bracing means pivotally connecting the sides of the bracket frame with the relatively fixed frame, and a platform supported at an intermediate point upon the transverse portion of the bracket frame and connected at its inner end with the relatively fixed frame.

9. A collapsible tree felling scaffold including a relatively fixed frame composed of spaced sides and upper and lower connecting rods, dogs pivoted to the frame by the upper rod and adapted to engage a tree, a bracket frame connected at its upper portion with the relatively fixed frame and having a lower supporting portion spaced from the relatively fixed frame, bracing means connecting the said frames, and a platform supported on the bracket frame and connected with the relatively fixed frame.

10. A tree felling scaffold including an inner frame provided with means for securing it to a tree, a collapsible bracket connected to the frame and having an offset supporting portion foldable approximately flat against the tree when the bracket is collapsed, and a platform supported at an intermediate point by the offset portion of the bracket, and means for detachably connecting the inner end of the platform with the frame.

In testimony, that I claim the foregoing as my own, I have hereto affixed my signature in the presence of two witnesses.

HENRY HARDISTY.

Witnesses:
J. M. SOCKERLY,
F. D. COUDEN.

Copies of this patent may be obtained for five cents each, by addressing the "Commissioner of Patents, Washington, D. C."